July 5, 1927.
C. A. COMSTOCK
VINE HOLDER
Filed July 28, 1926
1,635,071
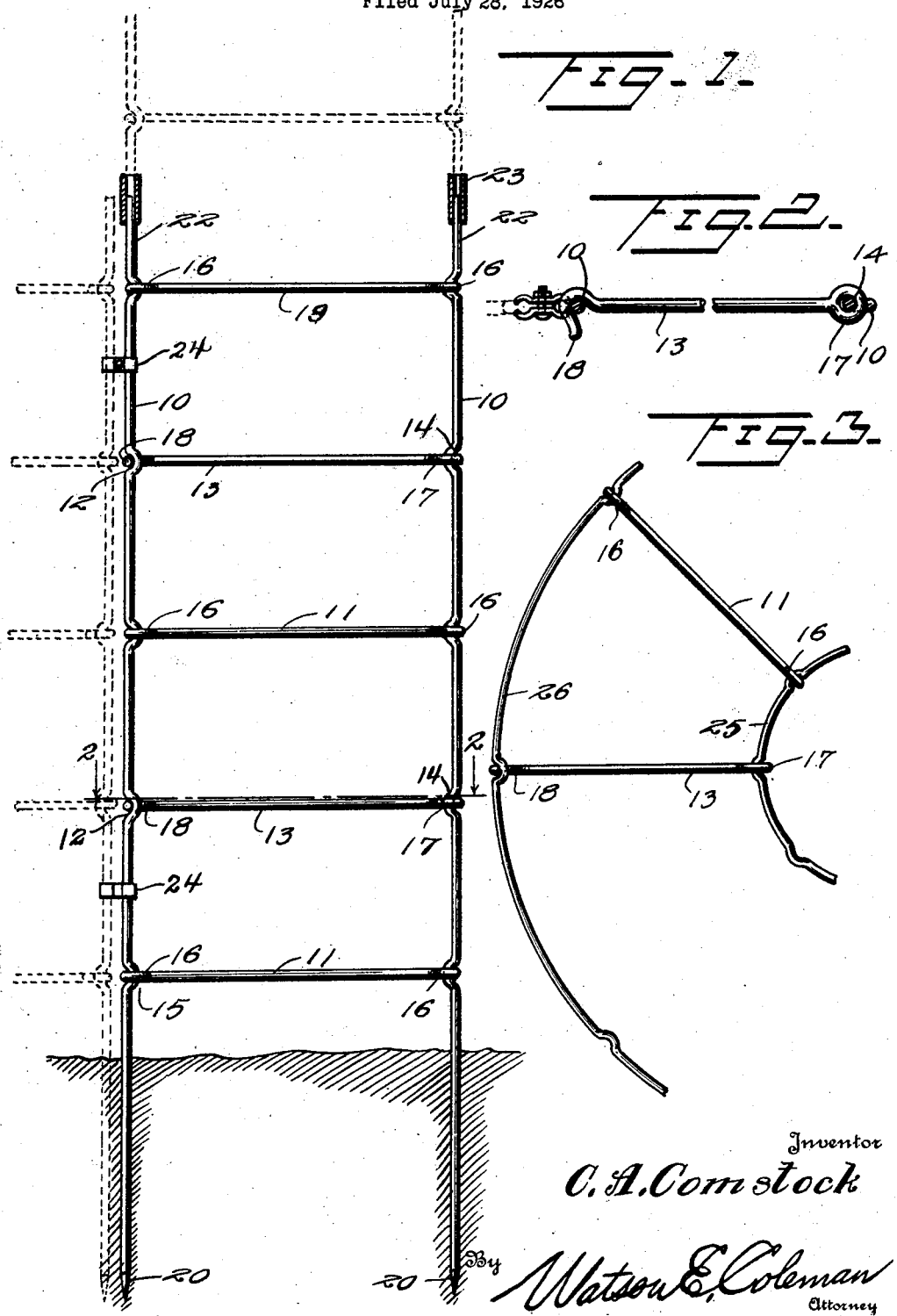
Inventor
C. A. Comstock
By Watson E. Coleman
Attorney Patented July 5, 1927.

1,635,071

UNITED STATES PATENT OFFICE.

CHARLIE A. COMSTOCK, OF FULLERTON, CALIFORNIA.

VINE HOLDER.

Application filed July 28, 1926. Serial No. 125,519.

This invention relates to vine holders and more particularly to a device of this character which may be constructed from small wire and readily applied to a plant which is already partially grown.

An important object of the invention is to provide a device of this character, the structure of which is such that while support is provided for the plant at relatively closely spaced intervals, in applying the device to the plant, certain of the supports can be temporarily shifted from their supporting positions, so that it will be unnecessary to make short flexes of the plant structure.

A further object of the invention is to provide a device of this character which may be placed at one side of the plant with certain of the supporting members in a non-supporting position and after these supporting members are moved to their supporting position provides a structure whereby the plant is entwined through the supports.

A further object of the invention is to provide a device of this character formed in sections which may be readily connected to one another to enlarge the supporting structure.

These and other objects I attain by the construction shown in the accompanying drawings, wherein for the purpose of illustration is shown a preferred embodiment of my invention and wherein:—

Figure 1 is a side elevation of a vine holder constructed in accordance with my invention, additional elements being indicated in dotted lines to show the manner of connecting the same;

Figure 2 is a section on the line 2—2 of Figure 1;

Figure 3 is a fragmentary sectional view of a different form of the device.

Referring now more particularly to the drawings, the numeral 10 generally designates side members connected at spaced points by permanent cross members 11 one permanent cross member being arranged adjacent the lower ends of the side members. Intermediate the permanent cross members 11, one of the side members 10 has pivoted thereto at 14 the ends of cross members 13, the opposite ends of which have a latching engagement with the other side member 10, as at 12.

In the present instance, the vertical members are shown as provided at spaced intervals with offsets 15. Corresponding alternate offsets of the side members 15 receive eyes 16 formed upon the ends of the permanent cross members 11, while the remaining offsets 15 of one of the side members receive eyes 17 formed upon one end of the intermediate cross members 13. The free ends of the intermediate cross members are provided with hooks 18 which may be engaged with the remaining offsets of the other side member 10 by slightly flexing the side member. In order to maintain the side members in properly spaced relation, an additional cross member 19 is provided to connect the side members adjacent the upper ends thereof, this cross member being welded or otherwise secured to the side members at its ends. The side members may take any one of a number of forms, two of which are illustrated.

In the form shown in Figure 1, the side members are straight and preferably have their lower ends pointed at 20, so that they will readily enter the ground. The upper ends of the side members are extended beyond the uppermost cross member, as at 22, and these ends are designed to be engaged by the lower ends of the sockets or sleeves 23, the upper ends of which will receive the lower ends of a similar vine holder, so that the length of the vine holder may be extended. If desired, two sections may be secured in side relation or a number of sections may be secured together in the form of a polygon by connecting the side members 10 by clips 24.

In the form shown in Figure 3, the side members are in the form of inner and outer rings 25 and 26. It will be obvious that a variety of other shapes might be employed without departing from the spirit of the invention.

In applying the device, the hinged cross members are swung to the open position and the vine or plant placed against one face of the permanent cross members. The hinged cross members are then replaced in their proper position, with the result that the stem of the plant will be flexed and arranged upon the opposite sides of the cross members 11 and 13, insuring a proper support therefor. The plant may thus be applied to the support without the necessity of passing the plant through the openings between adjacent cross members, thus avoiding all danger of breaking or bruising the same.

Since the construction hereinbefore set forth is obviously capable of a certain range of change and modification without materially departing from the spirit of the invention, I do not limit myself to such specific structure except as hereinafter claimed.

I claim:—

1. A vine holder comprising spaced side members, a plurality of spaced cross members connecting the side members and permanently connected therewith, said side members having offsets formed therein intermediate each pair of cross members and a plurality of other cross members hinged to one of the side members intermediate the first named cross members and having a latching engagement with the other of the side members, the last named cross members each having at one end an eye engaging an offset formed in one of the side members and at its opposite end a hook engaging in the bight of the corresponding offset in the other of the side members.

2. A vine holder comprising spaced side members, a plurality of spaced cross members connecting the side members and permanently connected therewith, a plurality of other cross members hinged to one of the side members intermediate the first named cross members and each having a latching engagement with the other of the cross members, a permanently connected cross member being arranged uppermost, the upper ends of the side members projecting above the uppermost cross member and sockets engageable with the upper ends of the side members and adapted to receive in their upper ends the lower ends of the side members of a similar vine holder.

3. A vine holder comprising spaced side members and a plurality of cross members connecting said side members, alternate cross members being permanently connected to the side members, the remaining cross members being hinged to one of the side members and having latching engagement with the other side member.

In testimony whereof I hereunto affix my signature.

CHARLIE A. COMSTOCK.